(12) United States Patent
Hamilton

(10) Patent No.: US 8,096,517 B1
(45) Date of Patent: Jan. 17, 2012

(54) STEERING WHEEL LAPTOP COMPUTER HOLDER

(76) Inventor: Steven Hamilton, Huntington Beach, CA (US)

( * ) Notice: Subject to any disclaimer, the term of this patent is extended or adjusted under 35 U.S.C. 154(b) by 0 days.

(21) Appl. No.: 12/460,684

(22) Filed: Jul. 23, 2009

Related U.S. Application Data

(63) Continuation-in-part of application No. 12/150,738, filed on Apr. 29, 2008, now abandoned.

(51) Int. Cl.
*F16B 45/00* (2006.01)
*A47G 29/00* (2006.01)
*A45C 1/04* (2006.01)

(52) U.S. Cl. ........ 248/308; 248/690; 248/339; 248/917; 248/918; 211/106.01; 211/124; 224/666; 224/560

(58) Field of Classification Search ............ 361/679.02, 361/679.27; 248/292.12, 305, 308, 685, 248/686, 690, 691, 692, 215, 339, 290.1, 248/294.1, 227.1, 227.4, 340, 341, 917, 918, 248/443, 444, 205.3, 205.4, 100, 276, 205.1; 16/438, 429; 108/30; 211/100, 8, 89, 120, 211/124, 70.2, 99, 106.01, 118, 89.01, 96; 224/321, 666, 667, 449, 560
See application file for complete search history.

(56) References Cited

U.S. PATENT DOCUMENTS

| | | | | |
|---|---|---|---|---|
| 892,413 A * | 7/1908 | Freeman | | 211/49.1 |
| 965,660 A * | 7/1910 | Samson | | 248/290.1 |
| 1,073,679 A * | 9/1913 | Haussman | | 248/316.5 |
| 1,587,676 A * | 6/1926 | Patterson | | 211/1.3 |
| 1,745,509 A * | 2/1930 | Schellberg | | 248/340 |
| 1,883,714 A * | 10/1932 | Gray | | 312/233 |
| 3,082,990 A * | 3/1963 | Nelson | | 248/308 |
| 3,259,086 A * | 7/1966 | Stein | | 110/340 |
| 3,995,803 A * | 12/1976 | Uitz | | 224/432 |
| 3,998,360 A * | 12/1976 | Mack | | 222/181.1 |
| 4,194,715 A * | 3/1980 | Forman et al. | | 248/311.2 |
| 4,301,935 A * | 11/1981 | Gokcen et al. | | 215/399 |
| 4,312,352 A * | 1/1982 | Meisch et al. | | 604/322 |
| 4,312,455 A * | 1/1982 | Weber | | 211/119.005 |
| 4,493,488 A * | 1/1985 | Panaia et al. | | 280/42 |
| 4,650,478 A * | 3/1987 | Dunn | | 604/322 |
| 4,872,224 A * | 10/1989 | Grimes et al. | | 4/541.3 |
| 4,878,324 A * | 11/1989 | Rissel | | 52/125.2 |
| 4,915,035 A * | 4/1990 | Clark et al. | | 108/44 |
| 4,998,694 A * | 3/1991 | Barteaux | | 248/100 |
| 5,005,791 A * | 4/1991 | Lanzen | | 248/99 |
| 5,044,038 A * | 9/1991 | Matkovic | | 15/159.1 |
| 5,177,665 A * | 1/1993 | Frank et al. | | 361/679.43 |
| 5,318,266 A * | 6/1994 | Liu | | 248/311.2 |
| 5,375,799 A * | 12/1994 | Rhodes | | 248/95 |
| 5,582,373 A * | 12/1996 | Baudot | | 248/166 |
| 5,601,541 A * | 2/1997 | Swisher | | 604/322 |
| 6,031,714 A * | 2/2000 | Ma | | 361/679.22 |
| 6,148,738 A * | 11/2000 | Richter | | 108/44 |
| 6,418,010 B1 * | 7/2002 | Sawyer | | 361/679.05 |
| 6,505,797 B1 * | 1/2003 | Dempsey | | 248/166 |
| 6,980,426 B2 * | 12/2005 | Kim | | 361/679.21 |
| 7,232,105 B2 * | 6/2007 | Want et al. | | 248/691 |
| 7,234,672 B1 * | 6/2007 | Osterholt et al. | | 248/304 |

(Continued)

*Primary Examiner* — Kimberly Wood
(74) *Attorney, Agent, or Firm* — Dennis W. Beech

(57) ABSTRACT

The present invention may be used for retaining a laptop computer on a generally horizontal member of a structure. One or more hooks may each have an arm rotatably attached at a first end to a screen housing opposite a screen of a laptop computer. The hooks may have a first projecting member attached approximately orthogonal to the arm at a second end.

20 Claims, 3 Drawing Sheets

U.S. PATENT DOCUMENTS

| | | | |
|---|---|---|---|
| 7,391,606 B2 * | 6/2008 | Chen et al. | 361/679.27 |
| 7,429,024 B2 * | 9/2008 | Boklund-Moran | 248/304 |
| 7,600,729 B2 * | 10/2009 | Valin | 248/304 |
| 2002/0138947 A1 * | 10/2002 | Jantschek | 16/371 |
| 2008/0169411 A1 * | 7/2008 | Quinn et al. | 248/691 |
| 2008/0192424 A1 * | 8/2008 | Lee | 361/683 |

* cited by examiner

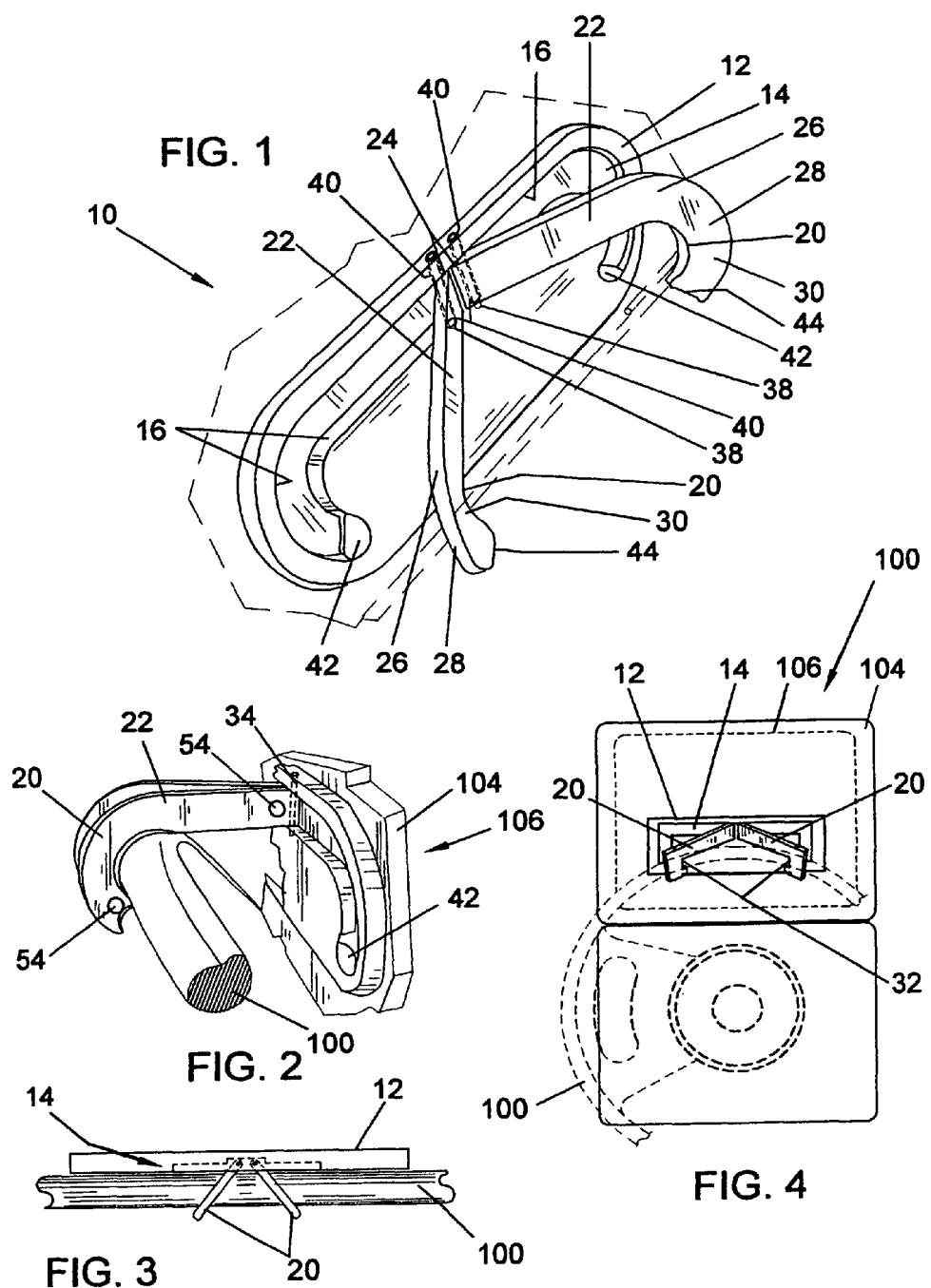

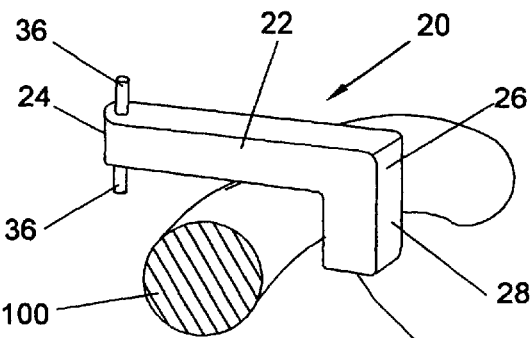
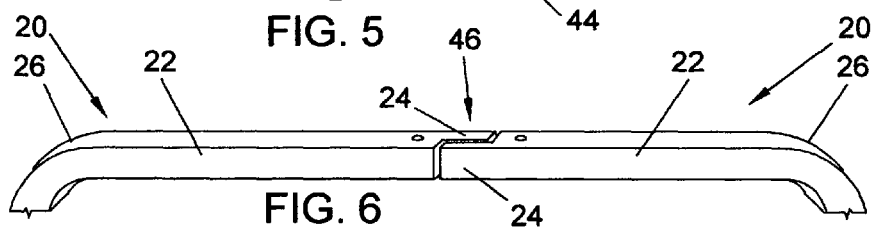
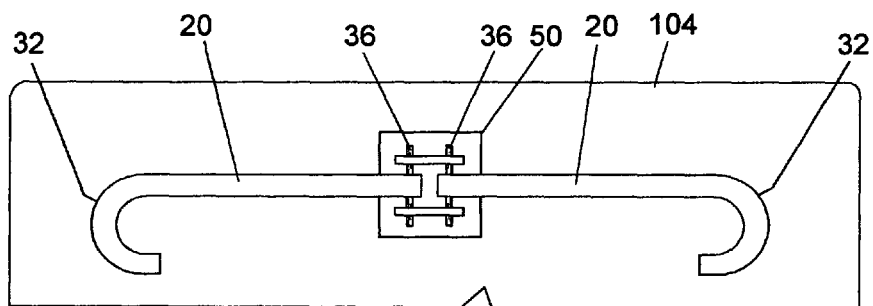
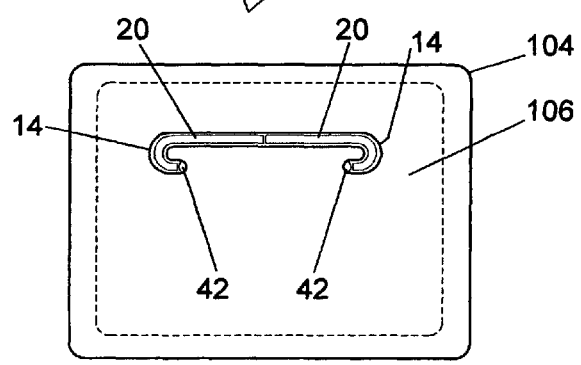

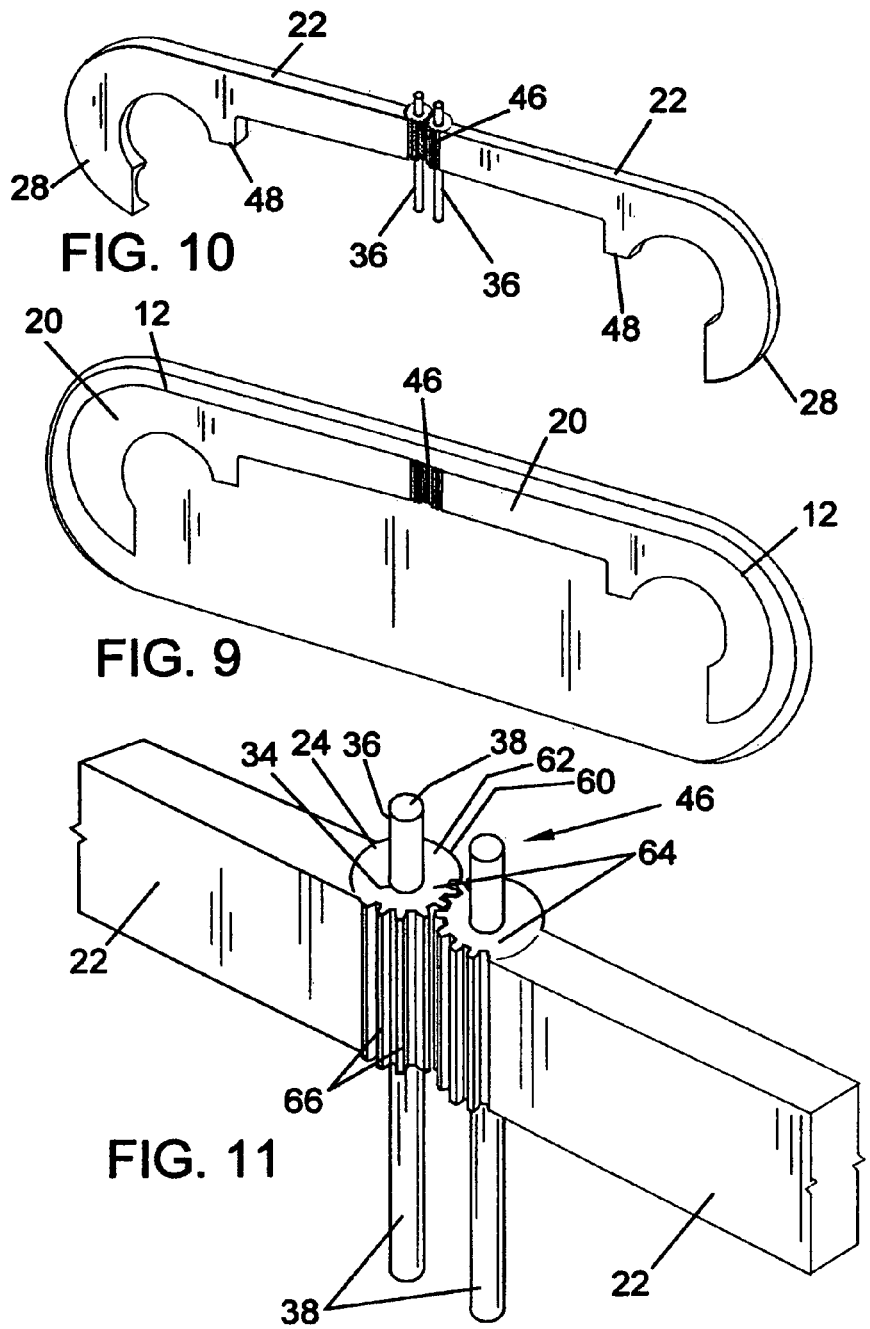

STEERING WHEEL LAPTOP COMPUTER HOLDER

CROSS-REFERENCE TO RELATED APPLICATION

This is a continuation-in-part application of U.S. patent application Ser. No. 12/150,738, filed on Apr. 29, 2008 now abandoned. U.S. patent application Ser. No. 12/150,738 is pending.

BACKGROUND OF THE INVENTION

This invention relates to devices that may be used to position a laptop computer on a steering wheel of a vehicle. The new laptop computer steering wheel retaining device may be attached to a laptop computer display screen housing positioned to allow hooks to be placed on a steering wheel.

Many trays, bracket assemblies, work station platforms, strap assemblies and clip boards may currently be known for positioning on a steering wheel, on a seat or floor, or on a console portion of a vehicle for a person to then locate various work objects. These support structures and assemblies may be used as writing surfaces. All of them tend to be bulky relative to the space available to a person seated in the drivers seat of a vehicle, the structures must be transported and stored when not in use, and many support structures or assemblies are difficult to install and remove.

SUMMARY OF THE INVENTION

The present invention is directed to devices for retaining a laptop computer on a generally horizontal member of a structure. One or more hooks may each have an arm rotatably attached at a first end to a screen housing opposite a screen of a laptop computer. The hooks may have a first projecting member attached approximately orthogonal to the arm at a second end.

These and other features, aspects and advantages of the present invention will become better understood with reference to the following drawings, description and claims.

BRIEF DESCRIPTION OF THE DRAWINGS

FIG. 1 illustrates a front elevation view of a holder according to an embodiment of the invention;

FIG. 2 illustrates a side elevation view of a holder according to an embodiment of the invention;

FIG. 3 illustrates a top view of a holder according to an embodiment of the invention;

FIG. 4 illustrates an elevation view of a laptop computer with holder positioned on a steering wheel according to an embodiment of the invention;

FIG. 5 illustrates a side elevation view of a hook according to an embodiment of the invention;

FIG. 6 illustrates a side view of a hook linkage according to an embodiment of the invention;

FIG. 7 illustrates a plan view of a holder according to an embodiment of the invention;

FIG. 8 illustrates a plan view of a screen housing with a holder according to an embodiment of the invention;

FIG. 9 illustrates a perspective view of a holder according to an embodiment of the invention;

FIG. 10 illustrates a perspective view of hooks and linkage according to an embodiment of the invention;

FIG. 11 illustrates a perspective view of a linkage according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Referring to FIGS. 1 through 8, a laptop computer holder 10 for use with a vehicle steering wheel 100 may have a housing 12, body or holder with one or more hooks 20 rotatably attached. The housing 12 may have a recessed channel or groove 14 for receipt of the hooks 20 for storage when not deployed for use. This may prevent accidental catching of a hook 20 on an object when transporting a laptop. The Figures illustrate use of two hooks 20 to be rotated outwardly from the housing 12 to be positioned or hooked onto a steering wheel 100.

A hook 20 may have an arm 22 with a first end 24 rotatably attached to the housing 12. The arm 22 at a second end 26 may have an approximately orthogonal a first projecting member 28 that may have attached approximately orthogonal second projecting members 30 that may be approximately parallel to the arm 22 to form a hook end 32 having an approximate "C" shape.

The first end 24 may have a bore 34 through which a pin 36 may be inserted with the ends 38 of the pin 36 inserted in bores 40 in the walls 16 of the groove 14. Alternatively, if the hooks 20 may be formed of a molded or casted material, for example, plastic or composites, the arm 22 may have protruding pins formed as part of the arm 22 structure to be inserted in bores 40. While the housing 12 is illustrated with two hooks 20 rotatably attached adjacent each first end 24, other configurations are also possible. An example may be that the hook ends 32 may be positioned adjacent each other when the hooks 20 are stored. The first ends 24 may then be rotatably attached to the housing 12 spaced apart by the lengths of the hook arms 22.

There may be finger space 42 provided as part of the groove 14 to allow ease of applying a force at the hook tip 44 or elsewhere on the hook 20 body to move a hook 20 out of a groove 14.

In use a laptop computer holder 10 may have the housing 12 structure molded as part of a laptop screen housing 104 opposite the screen 106, as best viewed in FIG. 8, or a housing 12 may be attached to an existing screen housing 104 with an adhesive or other fastening method, as best viewed in FIGS. 1 and 2. The hook or hooks 20 may be rotated outwardly relative to the screen housing 104 to be positioned on a structural element of a steering wheel 100. The preferred location may be the uppermost member of a steering wheel 100 that may have a convex curved shape as best viewed in FIG. 4. The hooks 20 at the hook ends 32 may be spaced apart when disposed on the steering wheel 100 to increase stability of the attachment to the steering wheel 100.

While a hook end 32 having a generally "C" shape has been described, other hook shapes may be used. An "L" shape hook 22, illustrated in FIG. 5, may also be used wherein the steering wheel 100 member may captured adjacent the intersection of the second end 26 of the arm 22 and the first projecting member 28. When two hook 20 first ends 24 may be rotatably attached to a housing 12 adjacent each other, a linkage 46 may be incorporated between the first ends 24 such that as one hook 20 is rotated, the second hook 20 will also rotate, for example, as illustrated in FIG. 6. The length of the hooks 20, and housing 12 with groove 14, if included, may be sized to fit a variety of steering wheel 100 configurations. The length may only be limited by the dimensions of the screen housing 104.

Rather than a housing 12, the hooks 20 may be rotatably attached to a bracket 50 that may be attached to the screen housing 104 as best viewed in FIG. 7. This may leave the hooks 20 susceptible to accidental catching on an object when the hooks 20 may be rotated against the screen housing 104 for storage. However, the structure may be simple and inexpensive to manufacture. While a housing 12 that is generally rectangular in shape has been disclosed, other shaped housings 12 may be used that allow a groove 14 to be formed therein for receipt of the hooks 20 for storage.

Referring to FIGS. 9 through 11, the linkage 46 may have a structure that includes a curved surface 60 first end 24 that may be in the form of a partial cylindrical element 62 attached at the first end 24. Each cylindrical element 62 may have gears 64 formed in a portion of the curved surface 60. The gear teeth 66 of the gears 64 may be formed for cooperative engagement of the first ends 24 of each hook 20 to cause the hooks 20 to each rotate if one hook is forced to rotate. Therefore, the hooks 20 may both be in a stored position in the groove 14 as best viewed in FIG. 9 and may rotate outwardly at the same time to be positioned on a structural element. The portion of the curved surface 60 that may have gear teeth 66 may determine the spaced apart location of the hooks 20 when they may be rotated outwardly. The hooks 20 may be positioned spaced apart as illustrated in FIG. 2 or 3 for stability of attachment to a steering wheel 100.

The hooks 20 may have a third projecting member 48 attached to the arm 20 to project generally in the same direction as the first projecting member 28 and to be spaced apart from the first projecting member 28, as best illustrated in FIG. 10. The third projecting member 48 may aid in positioning and stability of the hooks 20 on a structural element.

While the holder 10 has been described in the context of use with a steering wheel, other structures that have a generally horizontal member may be used for positioning a laptop computer 102 using the holder 10.

While the invention has been particularly shown and described with respect to the illustrated embodiments thereof, it will be understood by those skilled in the art that the foregoing and other changes in form and details may be made therein without departing from the spirit and scope of the invention.

I claim:

1. A device attached to a screen housing for retaining a laptop computer on a generally horizontal member of a structure comprising:
two hooks each with an arm rotatably attached adjacently to each other at a first end to a wall in a groove of a housing attached to said screen housing opposite a screen of said laptop computer wherein each said first end having a bore therein with a pin inserted through said bore with each end of said pin inserted in a groove bore of said groove;
each of said two hooks has a first projecting member attached approximately orthogonal to said arm at a second end; and
each of said two hooks is movable between a first position disposed in said groove and a second position extended outwardly at said second end relative to said housing.

2. The device as in claim 1 wherein said first projecting member has a second projecting member attached and disposed to be approximately parallel to said arm.

3. The device as in claim 1 wherein said groove has a finger space portion disposed adjacent a hook tip of each of said two hooks when positioned in said groove.

4. The device as in claim 1 wherein each of said first ends is engaged by a link to cause said first end of a first one of said two hooks to rotate when said first end of a second one of said two hooks is rotated.

5. The device as in claim 4 wherein said link comprising:
a curved surface at each of said first ends with a plurality of gear teeth formed therein; and
each of said first end plurality of gear teeth disposed for cooperative engagement for movement of said hooks to occur simultaneously.

6. The device as in claim 5 wherein said plurality of gear teeth are formed in a portion of said curved surface to position said arms spaced apart.

7. The device as in claim 1 wherein said housing is attached to said screen housing by an adhesive.

8. The device as in claim 1 wherein said housing is attached to said screen housing by a fastener.

9. The device as in claim 1 wherein said horizontal member of said structure is a steering wheel of a vehicle.

10. The device as in claim 1 wherein said housing is a generally rectangular flat bar shape.

11. The device as in claim 1 wherein said housing and said two hooks are constructed of plastic.

12. The device as in claim 1 wherein a third projection member is attached to said arm approximately parallel to said first projecting member and to be spaced apart from said first projecting member.

13. A device attached to a screen housing for retaining a laptop computer on a generally horizontal member of a structure comprising:
two hooks each with an arm rotatably attached adjacently to each other at a first end to a wall in a groove formed in a said screen housing opposite a screen of said laptop computer wherein each said first end having a bore therein with a pin inserted through said bore with each end of said pin inserted in a groove bore of said groove;
each of said two hooks has a first projecting member attached approximately orthogonal to said arm at a second end; and
each of said two hooks is movable between a first position disposed in said groove and a second position extended outwardly at said second end relative to said screen housing.

14. The device as in claim 13 wherein said first projecting member has a second projecting member attached and disposed to be approximately parallel to said arm.

15. The device as in claim 13 wherein said groove has a finger space portion disposed adjacent a hook tip of each of said two hooks when positioned in said groove.

16. The device as in claim 13 wherein each of said first ends is engaged in a link to cause said first end of a first one of said two hooks to rotate when said first end of a second one of said two hooks is rotated.

17. The device as in claim 16 wherein said link comprising:
a curved surface at each of said first ends with a plurality of gear teeth formed therein; and
each of said first end plurality of gear teeth disposed for cooperative engagement for movement of said hooks to occur simultaneously.

18. The device as in claim 17 wherein said plurality of gear teeth are formed in a portion of said curved surface to position said arms spaced apart.

19. The device as in claim 13 wherein said horizontal member of said structure is a steering wheel of a vehicle.

20. The device as in claim 13 wherein a third projection member is attached to said arm approximately parallel to said first projecting member and to be spaced apart from said first projecting member.

* * * * *